UNITED STATES PATENT OFFICE.

HENRY F. KNODERER AND LEVI F. KNODERER, OF CHILLICOTHE, OHIO.

COMPOSITION FOR PREVENTING INCRUSTATION OF STEAM-BOILERS.

Specification forming part of Letters Patent No. 26,683, dated January 3, 1860; Reissue No. 960, dated May 15, 1860.

*To all whom it may concern:*

Be it known that we, HENRY F. KNODERER and LEVI F. KNODERER, of Chillicothe, in the county of Ross and State of Ohio, have invented a new and improved mode of preventing the deposition and accumulation of "scales" of whatever kind on the interior of steam-boilers and the pipes belonging thereto; and we do hereby declare that the following is a full and exact description thereof.

The nature of our invention consists in putting into the boiler with the water thereof a preparation of two pounds of alum, one pound of glue, two pounds of wood-ashes, and four pounds of wheat-bran, which are to be pulverized and mixed, and put into a strong cloth sack and placed in the boiler or warm-water tank when in use, and will effectually prevent the deposition and accumulation of scales of whatever kind in the interior of steam-boilers and the pipes pertaining thereto.

What we claim as our invention, and desire to secure by Letters Patent, is—

The application of a compound of alum, glue, wood-ashes, and wheat-bran, prepared and applied as above specified, to prevent incrustations on the interior of steam-boilers and pipes of whatever kind pertaining thereto, as herein specified and substantially set forth.

H. FREDERICK KNODERER.
LEVI F. KNODERER.

Witnesses:
B. TRESENIDER,
J. S. NOTT.